United States Patent Office 2,852,537
Patented Sept. 16, 1958

2,852,537
CYCLOPENTANOPHENANTHRENE COMPOUNDS AND PROCESS

Howard J. Ringold and George Rosenkranz, Mexico City, Mexico, assignors to Syntex S. A., Mexico City, Mexico, a corporation of Mexico No Drawing. Application February 11, 1957
Serial No. 651,563

16 Claims. (Cl. 260—397.4)

The present invention relates to novel cyclopentanophenanthrene derivatives and to a process for the production thereof.

More particularly the present invention relates to the novel progestational hormones that are 2α-alkyl derivatives of 17α-ethinyl-Δ⁴-androsten-17β-ol-3-one and 17α-vinyl-Δ⁴-androsten-17β-ol-3-one. The compounds of the present invention above set forth have valuable oral progestational activity and other valuable qualities of hormones of the progestational type to a greater amount than known compounds such as those unsubstituted at C–2. The compounds of the present invention also exhibit valuable anti-androgenic qualities and are therefore useful for the relief of prostate cancers.

In accordance with the present invention it has been discovered that the novel compound just described may be prepared from the corresponding 2α-alkyl testosterone derivatives of our application Serial No. 632,016, filed January 2, 1957. In preparing the compounds of the present invention the 2α-alkyl testosterone is converted to a corresponding 17-keto derivative with a group at C–3 capable of conversion by hydrolysis to 3-keto group and unreactive to potassium acetalide. In one modification of the present process this type of intermediate is obtained by oxidation of the starting compound with chromic acid to form a dione followed by selective reaction of the 3-keto group with ethyl orthoformate to form a 3-mono enol ether. In another modification of the present process the starting material is reacted with ethylene glycol to form the 3-monoethylene ketal and this ketal is then oxidized to form a 3-ketal-17-keto derivative. Both of these types of compound are then reacted with potassium acetilide to form the 17α-ethinyl-3-ketal or 3-mono enol ether derivatives and hydrolyzed and rearranged to form the desired 2α-alkyl derivatives of 17α-ethinyl-Δ⁴-androsten-17β-ol. Upon hydrogenation in the presence of a hydrogenation catalyst until 1 equivalent of hydrogen was taken up the corresponding 17α-vinyl compounds were produced.

The novel hormones of the present invention may therefore be represented by the following formulas:

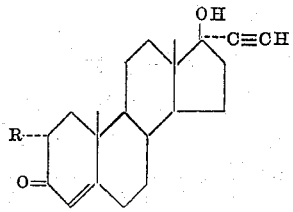

and

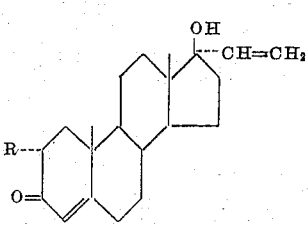

In the above formulas R represents an alkyl group, preferably a lower alkyl group of less than 7 carbon atoms such as methyl, ethyl or propyl.

The novel compounds of the present invention may be prepared by a process in part exemplified by the following equation:

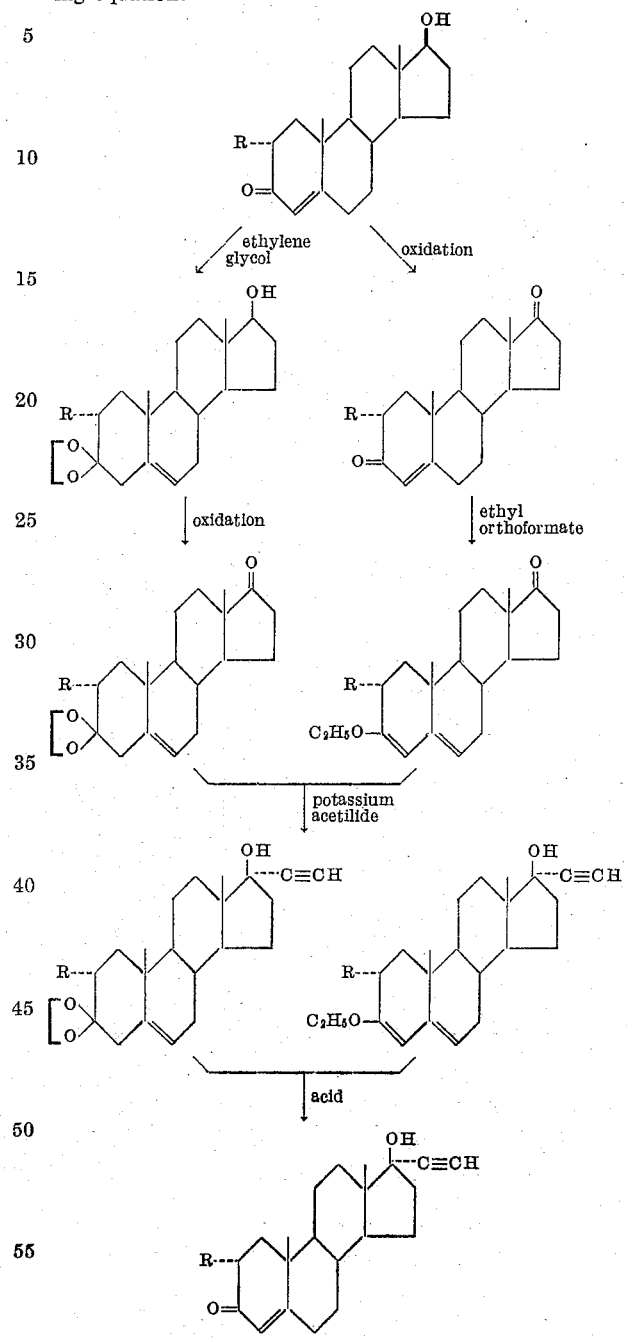

In the above equation R represents the same groups as heretofore set forth.

Another portion of the process of the present invention i. e. a process for the production of the aforementioned vinyl compounds is illustrated by the following equation:

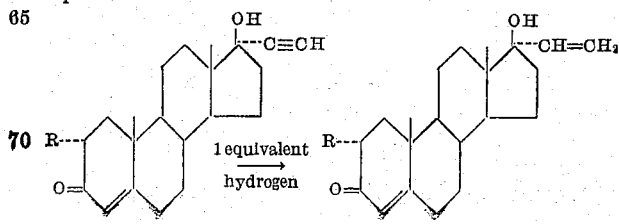

In the above equation R represents the same groups as heretofore.

Referring to the first of the foregoing equations, the starting material for the process namely 2α-alkyl or aralkyl-Δ⁴-androsten-17β-ol-3-one is prepared as set forth in our copending application Serial No. 632,016, filed January 2, 1957, by reacting testosterone with ethyl formate in the presence of sodium hydride to form the corresponding 2-hydroxymethylene derivative. This last compound is then reacted with an alkyl or aralkyl iodide such as methyl, ethyl, propyl or benzyl iodide to form the corresponding 2-alkyl or aralkyl-2'-formyl derivative. Removal of carbon monoxide from the formyl derivative by reaction with chromatographic type alumina of alkaline reaction then gave the 2α-alkyl or aralkyl-Δ⁴-androsten-17β-ol-3-one starting material.

The starting compound just described in accordance with the present invention was treated to convert the 17-hydroxy moity to a 17-keto group and the 3-keto group to group capable of acid hydrolysis to a keto group but inert to the action of potassium acetilide. In one type of reaction as indicated this involved reacting the starting material with ethylene glycol in the presence of p-toluene sulfonic acid to form the 3-monoethyleneketal of 2-alkyl testosterone. This ketal derivative upon treatment with chromic acid in pyridine at room temperature or slightly above for about one day gave the corresponding 3-monoethyleneketal of 2α-alkyl-androstenedione, a compound having a 17-keto group and a protected 3-keto group.

Another way to produce the desired 17-keto compound with a protected 3-keto group is also illustrated in the first of the foregoing equations. As illustrated the 2α-alkyl testosterone compound is first reacted with chromic acid preferably in acetic acid solution for about 12 hours at room temperature. The product is the corresponding 2α-methyl-androstenedione. This compound is then dissolved in an inert organic solvent such as benzene and a small amount of pyridine hydrochloride added followed by alcohol and ethyl orthoformate. After refluxing for about 5 hours with an intermediate addition of ethyl orthoformate and usual separation procedures the product was the 3-ethoxy-2α-alkyl-Δ³,⁵-androstadien-17-one derivative.

Treatment of either the 3-ethoxy-2α-alkyl-Δ³,⁵-androstadien-17-one derivatives or the 3-monoethyleneketal derivatives of androstenedione in solution in toluene with a solution of potassium metal in tertiary amyl alcohol, followed by acetylene gave after suitable separation and purification the corresponding 2α-alkyl-17α-ethinyl-Δ⁴-androstene-17β-ol-3-one derivative. Finally the protective group is removed and the 3-keto moity restored by hydrolyzing these derivatives with an acid medium, a mineral acid such as hydrochloric acid under reflux conditions being suitable.

As indicated in the last equation above, treatment of a 2α-alkyl-17α-ethinyl-Δ⁴androsten-17β-ol-3-one compound with one equivalent of hydrogen in the presence of a hydrogenation catalyst gave the corresponding 17α-vinyl compound.

The following specific examples serve to illustrate but are not intended to limit the present invention.

Example I

A mixture of 5 g. of 2α-methyl-testosterone, 100 cc. of benzene, 20 cc. of ethylene glycol previously distilled over potassium hydroxide and 1.2 g. of p-toluenesulfonic acid was refluxed for 18 hours with the use of an adapter for the continuous removal of the water formed during the reaction. The mixture was neutralized with saturated sodium bicarbonate solution, washed with water to neutral, dried over anhydrous sodium sulfate and evaporated to dryness under reduced pressure, thus giving 5.7 g. of the 3-monoethyleneketal of 2α-methyltestosterone, which was used without further purification for the next step.

5 g. of the 3-monoethylenketal of 2α-methyltestosterone dissolved in 35 cc. of anhydrous pyridine was mixed with a suspension of 1.7 g. of chromic acid in 15 cc. of anhydrous pyridine, suspension which had been prepared by adding the powdered chromic acid in four portions to the pyridine, maintaining the temperature below 35° C. by cooling in ice until the dark red color characteristic of chromic acid disappeared. The mixture was kept standing for 20 hours at room temperature and then diluted with ethyl acetate and filtered through a layer of celite. The filtrate was washed with water until the washes were colorless, dried over anhydrous sodium sulfate and evaporated to dryness under reduced pressure, thus producing 4.3 g. of the 3-monoethyleneketal of 2α-methyl-androstenedione, which was used without further purification for the experiment described in Example V.

Example II

The treatment of 2α-ethyl or 2α-propyl-testosterone by exactly the same method as described in the previous example produced the 3-monoethyleneketals of 2α-ethyl-androstenedione and 2α-propyl-androstenedione respectively.

Example III

A solution of 10 g. of 2α-methyl-testosterone in 200 cc. of 90% acetic acid was treated slowly and under stirring with a solution of 2.42 g. of chromic acid ($CrO_3$) in 20 cc. of 90% acetic acid. The mixture was kept standing overnight at room temperature and poured into water. Sodium chloride was added to saturate the solution, which was cooled and filtered, thus yielding 9.2 g. of 2α-methyl-androstenedione, which was used without further purification for the following operation.

A solution of 5 g. of this 2α-methyl-Δ⁴-androstene-3,17-dione in 125 cc. of thiophene free benzene was treated with 1 g. of pyridine hydrochloride and a small portion of the solvent was distilled in order to remove traces of moisture. 100 cc. of absolute alcohol and 100 cc. of ethyl orthoformate were added and the mixture was refluxed for 3 hours. 10 cc. of the mixture was distilled, 10 additional cc. of ethyl orthoformate was added and the refluxing was continued for 2 hours further. The solution was evaporated to dryness under vacuum, the residue was taken up in ether and the ether solution was washed, dried and evaporated to dryness. Crystallization from acetone-hexane and then from ether afforded 3-ethoxy-2α-methyl-Δ³,⁵-androstadien-17-one.

Example IV

Following the method described in Example III and using 2α-ethyl-testosterone and 2α-propyl-testosterone, there were obtained respectively 3-ethoxy-2α-ethyl-Δ³,⁵-androstadien-17-one and 3-ethoxy-2α-propyl-Δ³,⁵-androstadien-17-one.

Example V 6.56 g. of the 3-monoethyleneketal of 2α-methyl-androstenedione obtained in accordance with Example I, dissolved in 150 cc. of anhydrous toluene was mixed with a solution of 6.28 g. of potassium metal in 150 cc. of tertiary amyl alcohol which was prepared with slight heating under an atmosphere of nitrogen. A stream of nitrogen was passed through the solution for 15 minutes, followed by a stream of acetylene, previously washed, for 15 hours, at the end of which the mixture was poured into water, acidified with concentrated hydrochloric acid to pH 1, refluxed on the steam bath for half an hour and then the solvents were removed by steam distillation. The solid product was filtered from the cooled mixture and then recrystallized from ethyl acetate and the mother liquors were chromatographed in a column with washed alumina, thus producing 2α-methyl-17α-ethinyl-testosterone having a melting point of 175–178° C., $[\alpha]_D$ +3°.

Example VI

When applying the method described in Example V to the compounds obtained in accordance with Example II, there were obtained 2α-ethyl-17α-ethinyl-testosterone and 2α-propyl-17α-ethinyl-testosterone respectively.

Example VII

When applying the method described in Example V to the 3-enol-ether of 2α-methyl-androstenedione, obtained in accordance with Example III, there was obtained 2α-methyl-17α-ethinyl-testosterone, identical to the one obtained in accordance with Example V.

Example VIII

When applying the method described in Example V to the enol-ethers obtained in accordance with Example IV, there were obtained 2α-ethyl-17α-ethinyl-testosterone and 2α-propyl-17α-ethinyl-testosterone, identical to the ones obtained in accordance with Example VI.

Example IX 75 mg. of 5% palladium on calcium carbonate catalyst suspended in 10 cc. of pyridine was prehydrogenated. 3 mg. of 2α-methyl-17α-ethinyl-Δ⁴-androsten-17β-ol-3-one was introduced and hydrogen passed into the reaction vessel at atmospheric pressure and 25° C. until one equivalent of hydrogen was absorbed. The hydrogenation was stopped, the catalyst removed by filtration and the pyridine evaporated to dryness in vacuo. Crystallization of the product from acetone-hexane gave pure 2α-methyl-17α-vinyl-Δ⁴-androsten-17β-ol-3-one having a melting point of 159–162° C., [α]$_D$+89. On animal tests the compound showed anti-androgenic (chicks) and anti-estrogenic activity (rats) and therefore is useful for relief of prostatic, breast and cervical cancer.

Example X

By the method of Example IX but starting with 2α-ethyl-17α-ethinyl-Δ⁴-androsten-17β-ol-3-one and 2α-propyl-17α-ethinyl-Δ⁴-androsten-17β-ol-3-one there were prepared the corresponding 2α-ethyl-17α-vinyl-Δ⁴-androsten-17β-ol-3-one and 2α-propyl-17α-vinyl-Δ⁴-androsten-17β-ol-3-one.

We claim:

1. A process for the production of a 2α-alkyl-17α-ethinyl-Δ⁴-androsten-17β-ol-3-one compound comprising reacting a compound selected from the group consisting of a 3-monoethyleneketal of a 2α-alkyl-Δ⁴-androsten-3,17-dione and a 3-ethoxy-2α-alkyl-Δ³,⁵-androstadien-17-one with potassium acetylide to form the corresponding 17α-ethinyl derivatives and hydrolyzing these derivatives in an acid medium.

2. A process for the production of a 2α-alkyl-17α-ethinyl-Δ⁴-androsten-17β-ol-3-one compound comprising reacting a corresponding 2α-alkyl-Δ⁴-androsten-17β-ol-3-one compound with ethylene glycol to form the corresponding 3-monoethyleneketal compound, treating this compound with an oxidizing agent to form the corresponding 3-monoethyleneketal of a 2α-alkyl-Δ⁴-androsten-3,17-dione, reacting this last mentioned compound with potassium acetylide to form the corresponding 17α-ethinyl derivative and hydrolyzing this last mentioned derivative in an acid medium.

3. A process for the production of a 2α-alkyl-17α-ethinyl-Δ⁴-androsten-17β-ol-3-one compound comprising reacting a corresponding 2α-alkyl-Δ⁴-androsten-17β-ol-3-one compound with an oxidizing agent to form a 2α-alkyl-Δ⁴-androsten-3,17-dione, reacting the dione with ethyl orthoformate to selectively form a 3-ethoxy-2α-alkyl-Δ³,⁵-androstadien-17-one, reacting the last mentioned compound with potassium acetylide to form the corresponding 17α-ethinyl derivatives and hydrolyzing this derivative in an acid medium.

4. The method of claim 1 wherein the 2α-alkyl compound is 2α-methyl.

5. The method of claim 1 wherein the 2α-alkyl compound is 2α-ethyl.

6. The method of claim 1 wherein the 2α-alkyl compound is 2α-propyl.

7. A compound of the following formula:

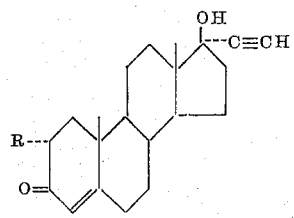

wherein R represents a lower alkyl group.

8. 2α-methyl-17α-ethinyl-Δ⁴-androsten-17β-ol-3-one.

9. 2α-ethyl-17α-ethinyl-Δ⁴-androsten-17β-ol-3-one.

10. 2α-propyl-17α-ethinyl-Δ⁴-androsten-17β-ol-3-one.

11. A process for the production of a 2α-alkyl-17α-vinyl-Δ⁴-androsten-17β-ol-3-one comprising treating a corresponding 2α-alkyl-17α-ethinyl-Δ⁴-androsten-17β-ol-3-one with one equivalent of hydrogen in the presence of a hydrogenation catalyst.

12. The process of claim 11 wherein the catalyst is a palladium on calcium carbonate catalyst.

13. A compound of the following formula:

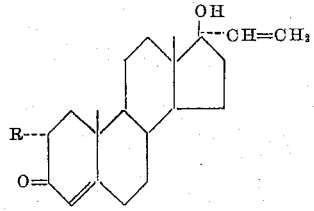

wherein R represents a lower alkyl group.

14. 2α-methyl-17α-vinyl-Δ⁴-androsten-17β-ol-3-one.

15. 2α-ethyl-17α-vinyl-Δ⁴-androsten-17β-ol-3-one.

16. 2α-propyl-17α-vinyl-Δ⁴-androsten-17β-ol-3-one.

No references cited.